(12) United States Patent
Tsunoya

(10) Patent No.: US 11,745,428 B2
(45) Date of Patent: ***Sep. 5, 2023

(54) THREE-DIMENSIONAL SHAPING APPARATUS AND THREE-DIMENSIONAL SHAPED ARTICLE PRODUCTION METHOD COMPRISING A PLASTICIZING SECTION

(71) Applicant: SEIKO EPSON CORPORATION, Tokyo (JP)

(72) Inventor: Akihiko Tsunoya, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/210,863

(22) Filed: Mar. 24, 2021

(65) Prior Publication Data

US 2021/0299959 A1    Sep. 30, 2021

(30) Foreign Application Priority Data

Mar. 27, 2020  (JP) ................................ 2020-057290

(51) Int. Cl.
*B33Y 50/02* (2015.01)
*B29C 64/35* (2017.01)
(Continued)

(52) U.S. Cl.
CPC ............ *B29C 64/35* (2017.08); *B29C 64/209* (2017.08); *B29C 64/364* (2017.08);
(Continued)

(58) Field of Classification Search
CPC .................................................... B33Y 50/02
See application file for complete search history.

(56) References Cited

U.S. PATENT DOCUMENTS

2016/0263827 A1* 9/2016 Fripp .................... B29C 64/124
2017/0028646 A1* 2/2017 Sun ........................ B33Y 99/00
(Continued)

FOREIGN PATENT DOCUMENTS

JP   2003-502184 A    1/2003
JP   2015-227019 A    12/2015
(Continued)

*Primary Examiner* — Suresh Suryawanshi
(74) *Attorney, Agent, or Firm* — WORKMAN NYDEGGER

(57) ABSTRACT

A three-dimensional shaping apparatus includes a plasticizing section that forms a plasticized material, a flow channel for the plasticized material, a nozzle having an ejection port, from which the plasticized material is ejected to a shaping region, a position changing mechanism that changes a relative position of the nozzle to the table, a pressure measurement section that measures a pressure in the flow channel, and a cleaning mechanism that is provided in a cleaning region different from the shaping region and cleans the ejection port, wherein a cleaning process for causing the cleaning mechanism to perform cleaning by suspending a shaping process in the middle of the shaping process, and moving the nozzle to the cleaning region is executed, and the shaping process is resumed when the pressure is measured to be a reference value or less by the pressure measurement section after executing the cleaning process.

10 Claims, 8 Drawing Sheets

(51) Int. Cl.
*B29C 64/209* (2017.01)
*B33Y 30/00* (2015.01)
*B29C 64/364* (2017.01)
*B29C 64/393* (2017.01)
*B33Y 10/00* (2015.01)
*B33Y 40/00* (2020.01)

(52) U.S. Cl.
CPC ............ *B29C 64/393* (2017.08); *B33Y 30/00* (2014.12); *B33Y 50/02* (2014.12); *B33Y 10/00* (2014.12); *B33Y 40/00* (2014.12)

(56) References Cited

U.S. PATENT DOCUMENTS

| | | | |
|---|---|---|---|
| 2018/0111306 A1 | 4/2018 | Mandel et al. | |
| 2018/0126672 A1* | 5/2018 | Chen | B33Y 40/00 |
| 2019/0061243 A1 | 2/2019 | Saito et al. | |
| 2019/0126554 A1 | 5/2019 | Iwase | |
| 2019/0168446 A1* | 6/2019 | Leibig | B29C 64/209 |
| 2020/0324341 A1* | 10/2020 | Liu | B22F 12/53 |

FOREIGN PATENT DOCUMENTS

| | | | | |
|---|---|---|---|---|
| JP | 2018-069732 A | 5/2018 | | |
| JP | 2019-077152 A | 5/2019 | | |
| JP | 2019-081263 A | 5/2019 | | |
| WO | WO-2017108071 A1 * | 6/2017 | ........... | B29C 64/106 |

* cited by examiner

THREE-DIMENSIONAL SHAPING APPARATUS AND THREE-DIMENSIONAL SHAPED ARTICLE PRODUCTION METHOD COMPRISING A PLASTICIZING SECTION

The present application is based on, and claims priority from JP Application Serial Number 2020-057290, filed on Mar. 27, 2020, the disclosure of which is hereby incorporated by reference herein in its entirety.

BACKGROUND

1. Technical Field

The present disclosure relates to a three-dimensional shaping apparatus and a three-dimensional shaped article production method.

2. Related Art

Heretofore, a three-dimensional shaping apparatus for shaping a three-dimensional shaped article by ejecting a shaping material plasticized by a plasticizing section from a nozzle to a table has been used. For example, JP-A-2019-81263 (Patent Document 1) discloses a three-dimensional shaping apparatus for shaping a three-dimensional shaped article by ejecting a shaping material plasticized by a flat screw from a nozzle to a shaping stand.

However, in a three-dimensional shaping apparatus in which a shaping material plasticized by a plasticizing section is ejected from a nozzle as disclosed in Patent Document 1, the shaping material sometimes leaks out from the nozzle accompanying the formation of the shaping material plasticized by the plasticizing section, or the like. Here, for example, a three-dimensional model production apparatus disclosed in JP-A-2003-502184 (Patent Document 2) includes a nozzle cleaning assembly that removes a model production material adhered to a nozzle. In this manner, there is a three-dimensional shaping apparatus including a nozzle cleaning mechanism, however, in such a three-dimensional shaping apparatus in the related art, a cleaning process is not sufficient, and therefore, the shaping material leaking out from the nozzle adheres to a three-dimensional shaped article during shaping, and the shaping accuracy of the three-dimensional shaped article to be shaped is sometimes deteriorated.

SUMMARY

A three-dimensional shaping apparatus according to the present disclosure for solving the above problem includes a plasticizing section that forms a plasticized material by plasticizing a material, a flow channel, through which the plasticized material flows, a nozzle that communicates with the flow channel and has an ejection port, from which the plasticized material is ejected to a shaping region of a table, an ejection adjustment mechanism that adjusts an ejection amount of the plasticized material from the ejection port, a position changing mechanism that changes a relative position of the nozzle to the table, a pressure measurement section that measures a pressure in the flow channel, a cleaning mechanism that is provided in a cleaning region different from the shaping region and cleans the ejection port, and a control unit that controls the nozzle, the ejection adjustment mechanism, the position changing mechanism and executes a shaping process for shaping a three-dimensional shaped article by stacking layers of the plasticized material at the table, wherein the control unit executes a cleaning process for causing the cleaning mechanism to perform cleaning by suspending the shaping process in the middle of the shaping process, and moving the nozzle to the cleaning region, and resumes the shaping process when the pressure measured by the pressure measurement section is a reference value or less after executing the cleaning process.

DESCRIPTION OF EXEMPLARY EMBODIMENTS

Figure 1:
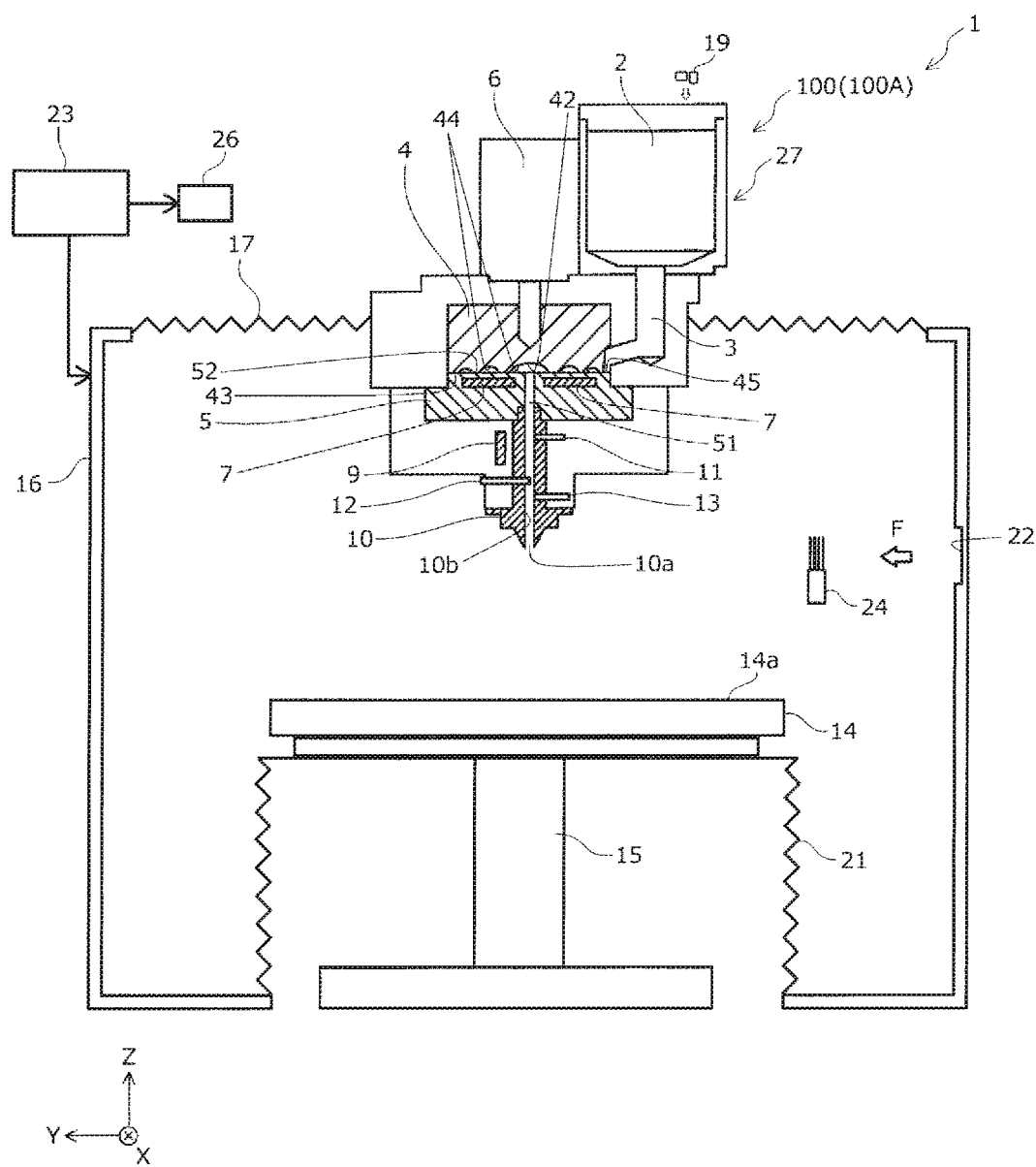
FIG. 1 is a schematic cross-sectional view showing a configuration of a three-dimensional shaping apparatus of one embodiment of the present disclosure.

First, the present disclosure will be schematically described.

A three-dimensional shaping apparatus according to a first aspect of the present disclosure for solving the above problem includes a plasticizing section that forms a plasticized material by plasticizing a material, a flow channel, through which the plasticized material flows, a nozzle that communicates with the flow channel and has an ejection port, from which the plasticized material is ejected to a shaping region of a table, an ejection adjustment mechanism that adjusts an ejection amount of the plasticized material from the ejection port, a position changing mechanism that changes a relative position of the nozzle to the table, a pressure measurement section that measures a pressure in the flow channel, a cleaning mechanism that is provided in a cleaning region different from the shaping region and cleans the ejection port, and a control unit that controls the nozzle, the ejection adjustment mechanism, and the position changing mechanism and executes a shaping process for shaping a three-dimensional shaped article by stacking layers of the plasticized material at the table, wherein the control unit executes a cleaning process for causing the cleaning mechanism to perform cleaning by suspending the shaping process in the middle of the shaping process, and moving the nozzle to the cleaning region, and resumes the shaping process when the pressure measured by the pressure measurement section is a reference value or less after executing the cleaning process.

According to this aspect, the shaping process is resumed when the pressure measured by the pressure measurement section is the reference value or less after executing the cleaning process. Therefore, when the shaping process is resumed, the shaping material can be prevented from leaking out from the nozzle so that the adhesion of the shaping material to a three-dimensional shaped article can be suppressed. Accordingly, a decrease in shaping accuracy of the three-dimensional shaped article can be suppressed.

In a three-dimensional shaping apparatus according to a second aspect of the present disclosure, in the first aspect, the ejection adjustment mechanism is provided in the flow channel, and the pressure measurement section measures the pressure in the flow channel between the ejection adjustment mechanism and the ejection port.

According to this aspect, the ejection adjustment mechanism that adjusts the ejection amount of the plasticized material is included, and therefore, the shaping accuracy of a three-dimensional shaped article can be enhanced. Further, the pressure measurement section measures the pressure in the flow channel at a position between the ejection adjustment mechanism and the ejection port, and therefore, the pressure near the ejection port can be accurately measured regardless of the magnitude of the amount of movement of the plasticized material in the flow channel by driving the ejection adjustment mechanism.

In a three-dimensional shaping apparatus according to a third aspect of the present disclosure, in the first aspect, the ejection adjustment mechanism is provided in the flow channel, and the pressure measurement section measures the pressure in the flow channel between the plasticizing section and the ejection adjustment mechanism after adjustment by the ejection adjustment mechanism so that the plasticized material is in an ejectable state from the ejection port.

According to this aspect, the ejection adjustment mechanism that adjusts the ejection amount of the plasticized material is included, and therefore, the shaping accuracy of a three-dimensional shaped article can be enhanced. Further, the pressure measurement section measures the pressure in the flow channel at a position between the plasticizing section and the ejection adjustment mechanism, but the pressure is measured after adjustment by the ejection adjustment mechanism so that the plasticized material is in an ejectable state. Accordingly, even when the pressure measurement section measures the pressure in the flow channel at a position between the plasticizing section and the ejection adjustment mechanism, the pressure near the ejection port can be accurately measured.

In a three-dimensional shaping apparatus according to a fourth aspect of the present disclosure, in any one of the first to third aspects, as a nozzle for a plasticized material that ejects the plasticized material, a nozzle for a shaping material that ejects a shaping material for shaping a three-dimensional shaped article and a nozzle for a support material that ejects a support material for supporting the shaping material are included, as the pressure measurement section, a pressure measurement section for a shaping material that measures the pressure in the flow channel in the nozzle for a shaping material, and a pressure measurement section for a support material that measures the pressure in the flow channel in the nozzle for a support material are included, and the control unit drives the nozzle for a shaping material and the nozzle for a support material in a switching manner, and also executes the cleaning process for both the nozzle for a shaping material and the nozzle for a support material when switching, and resumes the shaping process after the pressure in the flow channel in the nozzle for a shaping material and in the flow channel in the nozzle for a support material becomes a predetermined value or less.

According to this aspect, the nozzle for a support material that ejects a support material is included, and therefore, by shaping a three-dimensional shaped article using the support material, the shaping accuracy of the three-dimensional shaped article can be enhanced. Further, when the nozzle for a shaping material and the nozzle for a support material are switched, the cleaning process is executed for both nozzles, and the shaping process is resumed after the pressure in the flow channel in the nozzle for a shaping material and in the flow channel in the nozzle for a support material becomes a predetermined value or less. Therefore, the shaping process can be resumed after the pressure in the flow channel in the nozzle for a shaping material and in the flow channel in the nozzle for a support material becomes normal, and thus, adhesion of the shaping material leaking out from the nozzle to a three-dimensional shaped article during shaping can be suppressed, so that the shaping accuracy of the three-dimensional shaped article can be enhanced.

In a three-dimensional shaping apparatus according to a fifth aspect of the present disclosure, in any one of the first to fourth aspects, the control unit executes the cleaning process when the pressure is measured to be a predetermined value or more by the pressure measurement section.

According to this aspect, the cleaning process is executed when the pressure is measured to be a predetermined value or more by the pressure measurement section. Therefore, it is accurately determined when the cleaning process is needed, and the cleaning process can be executed.

In a three-dimensional shaping apparatus according to a sixth aspect of the present disclosure, in any one of the first to fifth aspects, the control unit prevents the plasticizing section from being driven during execution of the cleaning process.

The pressure in the flow channel sometimes varies during driving of the plasticizing section, and when the cleaning process is executed in such a state, the cleaning process is not appropriately executed in some cases. However, according to this aspect, the plasticizing section is not driven during execution of the cleaning process. Therefore, the cleaning process is prevented from being not appropriately executed.

In a three-dimensional shaping apparatus according to a seventh aspect of the present disclosure, in any one of the first to sixth aspects, the plasticizing section includes a drive motor, a screw that is rotated by the drive motor and has a groove formed face with a spiral groove formed therein, a barrel that has an opposed face opposed to the groove formed face and is provided with a communication hole, and a heating section that heats at least one of the screw and the barrel.

According to this aspect, since the plasticizing section has such a configuration, a solid material can be effectively plasticized.

In a three-dimensional shaping apparatus according to an eighth aspect of the present disclosure, in any one of the first to seventh aspects, the cleaning process includes an ejection amount adjustment process for performing adjustment of the ejection amount of the plasticized material from the nozzle using at least one of a line width of the plasticized material ejected from the ejection port and the ejection amount of the plasticized material ejected from the ejection port.

According to this aspect, the ejection amount adjustment process is performed using at least one of the line width of the plasticized material ejected from the ejection port and the ejection amount of the plasticized material ejected from the ejection port in the cleaning process. Therefore, the cleaning process is executed, and also the adjustment of the ejection amount can be performed.

In a three-dimensional shaping apparatus according to a ninth aspect of the present disclosure, in any one of the first to eighth aspects, a chamber whose internal temperature is adjustable is included, and the cleaning mechanism is provided in the chamber.

According to this aspect, a chamber whose internal temperature is adjustable is included, and the cleaning mechanism is provided in the chamber. Therefore, the cleaning performance can be improved by adjusting the temperature of the cleaning mechanism.

In a three-dimensional shaping apparatus according to a tenth aspect of the present disclosure, in the ninth aspect, the chamber has a warm air inlet inside, and the cleaning mechanism has a brush that comes in contact with a face where the ejection port is formed at a position where warm air is introduced from the warm air inlet.

According to this aspect, the cleaning mechanism has a brush that comes in contact with a face where the ejection port is formed at a position where warm air is introduced from the warm air inlet. Therefore, cleaning of the nozzle can be effectively executed using the brush while adjusting the temperature at the cleaning position.

A three-dimensional shaped article production method according to an eleventh aspect of the present disclosure is a three-dimensional shaped article production method for producing a three-dimensional shaped article by ejecting a plasticized material from a nozzle that communicates with a flow channel and includes a shaping processing step of shaping the three-dimensional shaped article by stacking layers of the plasticized material in a shaping region of a table, a cleaning processing step of performing cleaning by suspending the shaping processing step in the middle of the shaping processing step and moving the nozzle to a cleaning region that is different from the shaping region, and a resuming step of resuming the shaping processing step when a pressure in the flow channel is a reference value or less after executing the cleaning processing step.

According to this aspect, the shaping processing step is resumed when the pressure measured by the pressure measurement section is the reference value or less after executing the cleaning processing step. Therefore, when the shaping processing step is resumed, the shaping material can be prevented from leaking out from the nozzle so that the adhesion of the shaping material to a three-dimensional shaped article can be suppressed. Accordingly, a decrease in shaping accuracy of the three-dimensional shaped article can be suppressed.

Hereinafter, embodiments according to the present disclosure will be described with reference to the accompanying drawings. The following drawings are all schematic views and some constituent members are omitted or simplified. Further, in the respective drawings, an X-axis direction is a horizontal direction, and a Y-axis direction is a horizontal direction and also a direction orthogonal to the X-axis direction, and a Z-axis direction is a vertical direction.

First, the entire configuration of a three-dimensional shaping apparatus 1 that is one embodiment of the present disclosure will be described with reference to FIGS. 1 to 5. The three-dimensional shaping apparatus 1 of this embodiment is a three-dimensional shaping apparatus for shaping a three-dimensional shaped article by stacking layers of a shaping material and a support material, each as a plasticized material, at a table 14 as a shaping stand. Note that the "three-dimensional shaping" as used herein refers to the formation of a so-called stereoscopically shaped article, and also includes, for example, the formation of a shape having a thickness even if it is in a flat plate shape or a so-called two-dimensional shape, for example, like a shape constituted by a layer corresponding to one layer. Further, the "support" is meant to include not only a case of supporting from a lower side, but also a case of supporting from a lateral side, and a case of supporting from an upper side in some cases.

As shown in FIG. 1, the three-dimensional shaping apparatus 1 of this embodiment includes a plasticizing section 27. The plasticizing section 27 includes a hopper 2 that stores a pellet 19 as a solid material constituting a three-dimensional shaped article. The pellet 19 stored in the hopper 2 is supplied, through a supply pipe 3, to a material inflow port 45 of a flat screw 4 in a substantially cylindrical shape that rotates around the Z-axis direction as a rotation axis by a driving force of a drive motor 6.

Figure 2:
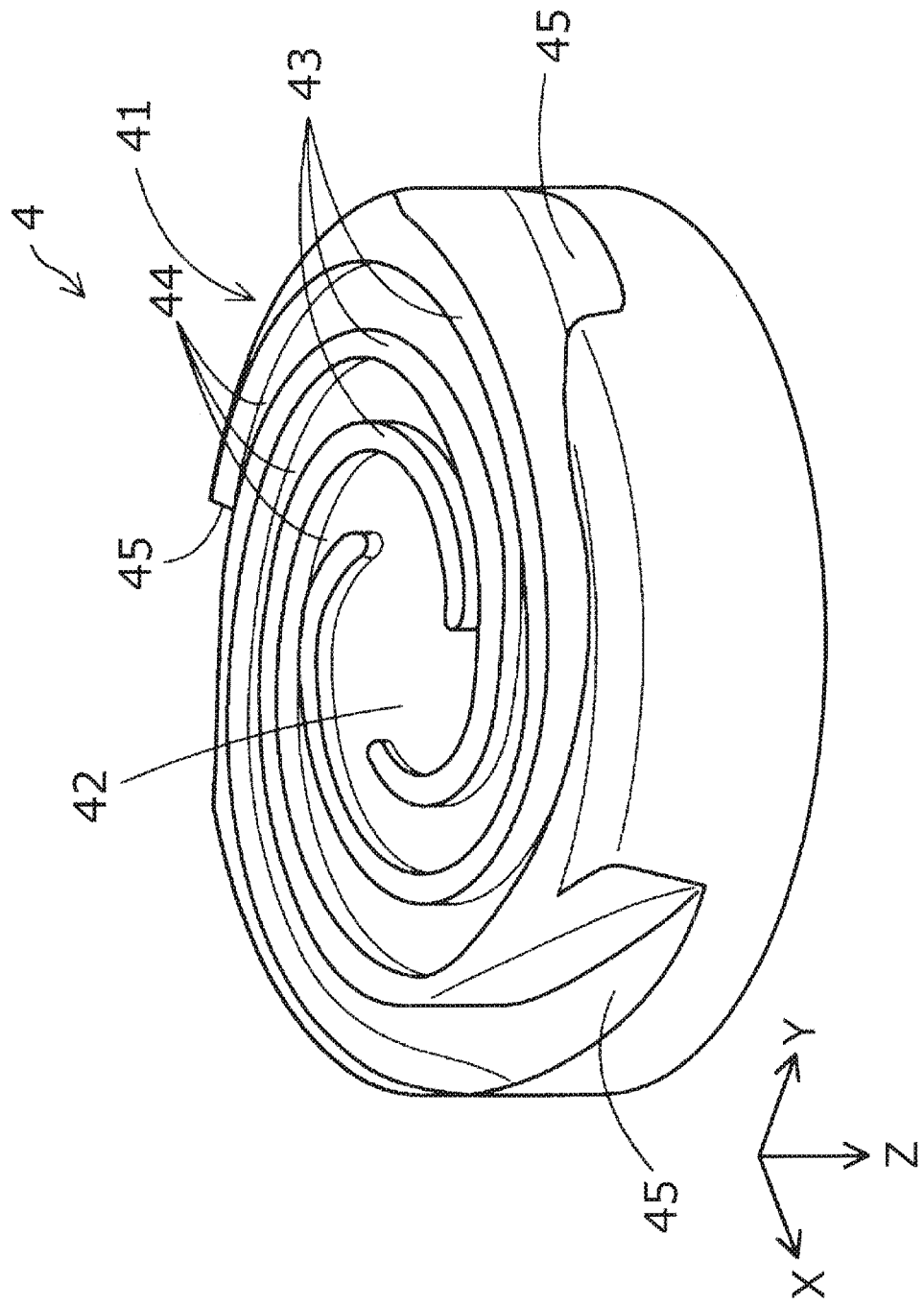
FIG. 2 is a schematic perspective view showing a configuration of a flat screw in a three-dimensional shaping apparatus of one embodiment of the present disclosure.

As shown in FIG. 2, a central portion 42 of a groove formed face 41 of the flat screw 4 is constituted as a recess to which one end of a groove 44 is coupled. The central portion 42 is opposed to a communication hole 51 of a barrel 5 shown in FIGS. 1 and 3. The groove 44 of the flat screw 4 is constituted by a so-called scroll groove and is formed in a spiral shape so as to draw an arc toward an outer circumferential face side of the flat screw 4 from the central portion 42. The groove 44 may be configured in a helical shape. In the groove formed face 41, a protrusion portion 43 that constitutes a side wall portion of the groove 44 and extends along each groove 44 is provided.

In the groove formed face 41 of the flat screw 4 in this embodiment, three grooves 44 and three protrusion portions 43 are formed, however, the number thereof is not limited to three, and one or two or more arbitrary number of grooves 44 and protrusion portions 43 may be formed, respectively. Further, an arbitrary number of protrusion portions 43 may be provided according to the number of grooves 44. Further, in the outer circumferential face of the flat screw 4 in this embodiment, three material inflow ports 45 are formed so as to be arranged at equal intervals along the circumferential direction. The number of material inflow ports 45 is not limited to three, and one or two or more arbitrary number of material inflow ports 45 may be formed, and the arrangement is not limited to the arrangement at equal intervals, and the material inflow ports may be formed so as to be arranged at different intervals.

Figure 3:
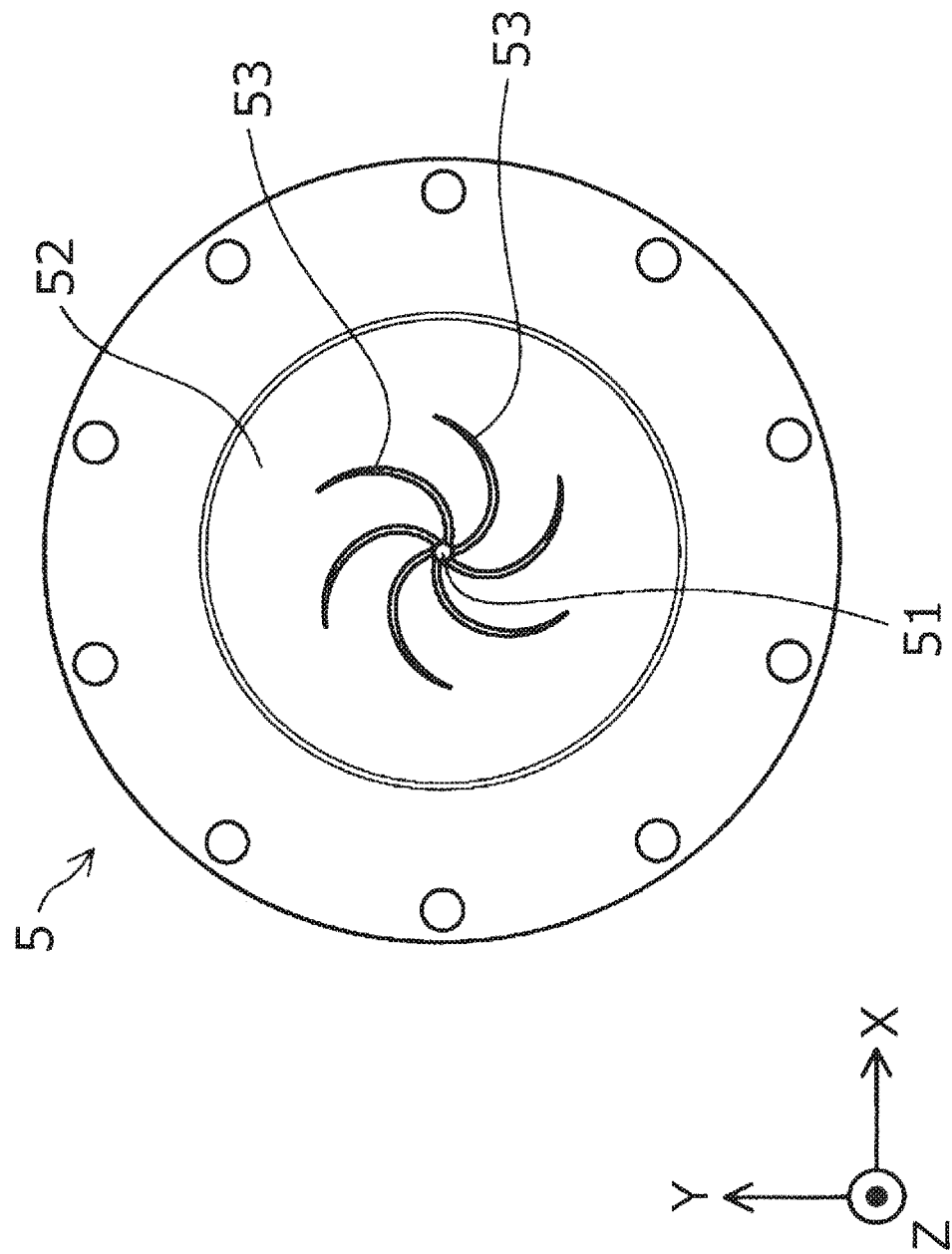
FIG. 3 is a schematic plan view showing a configuration of a barrel in a three-dimensional shaping apparatus of one embodiment of the present disclosure.

As shown in FIG. 3, the barrel 5 has a substantially disk shape as the external shape and is disposed opposite to the groove formed face 41 of the flat screw 4. In the barrel 5, a circular heater 7 that is a heating section for heating the material is embedded. In the barrel 5, the communication hole 51 is formed. The communication hole 51 functions as a flow channel that guides the plasticized material to a nozzle 10. The communication hole 51 is formed at the center of an opposed face 52. In the opposed face 52, a plurality of guide grooves 53, each of which is coupled to the communication hole 51, and extends in a spiral shape toward the outer circumference from the communication hole 51, are formed. The plurality of guide grooves 53 each have a function of guiding the plasticized material flowing in the central portion 42 of the flat screw 4 to the communication hole 51. Note that in order to efficiently guide the plasticized material to the communication hole 51, the guide groove 53 is preferably formed in the barrel 5, but the guide groove 53 need not be formed.

Since the flat screw 4 and the barrel 5 have such a configuration, by rotating the flat screw 4, the pellet 19 is supplied to a space portion formed between the groove formed face 41 of the flat screw 4 and the opposed face 52 of the barrel 5 corresponding to the position of the groove 44, and the pellet 19 moves to the central portion 42 from the material inflow port 45. When the pellet 19 moves in the space portion made by the groove 44, the pellet 19 is melted by heat of the heater 7. Further, the pellet 19 is pressurized by a pressure accompanying the movement in the narrow space portion. In this manner, the pellet 19 is plasticized and supplied to the nozzle 10 through the communication hole 51 and injected from an ejection port 10a. In this embodiment, the heater 7 is embedded in the barrel 5, but the heater 7 may be disposed at any place as long as the pellet 19 is melted, and for example, the heater 7 may be embedded in the flat screw 4.

Further, as shown in FIG. 1, in the nozzle 10, a flow channel 10b that is coupled to the communication hole 51 and has the ejection port 10a in a tip portion is formed. The communication hole 51 can be regarded as forming a portion of the flow channel 10b. Then, around the nozzle 10, a heater 9 that heats the plasticized material flowing through the flow channel 10b, a pressure measurement section 11 that measures the internal pressure of the flow channel 10b, a flow rate adjustment mechanism 12 for the plasticized material flowing through the flow channel 10b, and a suction section 13 that releases the internal pressure of the flow channel 10b are provided.

Figure 4:
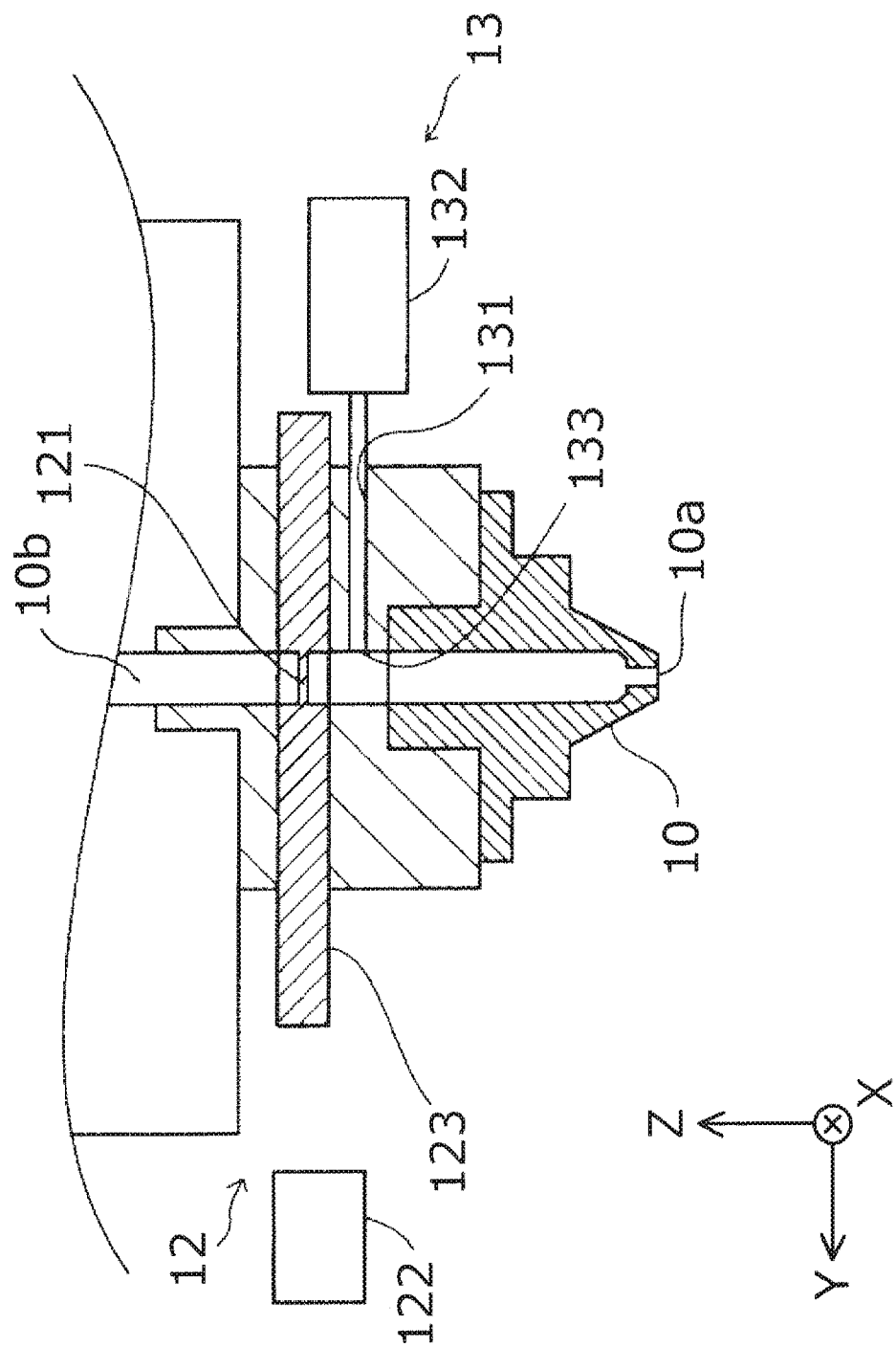
FIG. 4 is a schematic cross-sectional view showing a configuration of a peripheral portion of a nozzle in a three-dimensional shaping apparatus of one embodiment of the present disclosure.

As shown in FIG. 4, the flow rate adjustment mechanism 12 includes a butterfly valve 121, a valve drive section 122, and a drive shaft 123. The flow rate adjustment mechanism 12 is provided in the flow channel 10b and controls the flow rate of the plasticized material moving through the flow channel 10b. The butterfly valve 121 is a plate-shaped member obtained by processing a portion of the drive shaft 123 into a plate shape. The butterfly valve 121 is rotatably placed in the flow channel 10b. The drive shaft 123 is a shaft member provided so as to be perpendicular to the flow channel 10b and crosses the flow channel 10b at right angles. The drive shaft 123 is provided so that the position of the butterfly valve 121 becomes a position where the drive shaft 123 and the flow channel 10b cross each other.

The valve drive section 122 is a drive section having a mechanism for rotating the drive shaft 123. The butterfly valve 121 is rotated by the rotation drive force of the drive shaft 123 generated by the valve drive section 122. Specifically, the butterfly valve 121 is rotated by the rotation of the drive shaft 123 so that the position of the butterfly valve 121 is any of the following positions: a first position where the moving direction of the plasticized material in the flow channel 10b (−Z direction) and the surface direction of the butterfly valve 121 become substantially perpendicular; a second position where the moving direction of the plasticized material in the flow channel 10b and the surface direction of the butterfly valve 121 become substantially parallel; and a third position where the moving direction of the plasticized material in the flow channel 10b and the surface direction of the butterfly valve 121 form any angle of more than 0° and less than 90°. In FIG. 4, a state where the position of the butterfly valve 121 is the first position is shown.

By rotating the butterfly valve 121, the area of the opening formed in the flow channel 10b is adjusted. By adjusting the area of the opening, the flow rate of the plasticized material moving through the flow channel 10b is adjusted. Further, by bringing about a state where the area of the opening is zero (a state where the butterfly valve 121 closes the flow channel 10b), a state where the flow rate of the plasticized material moving through the flow channel 10b is zero can also be brought about. That is, the flow rate adjustment mechanism 12 can control start and stop of flowing of the plasticized material moving through the flow channel 10b, and adjustment of the flow rate of the plasticized material.

The suction section 13 is coupled between the butterfly valve 121 and the ejection port 10a in the flow channel 10b. The suction section 13 suppresses tailing that is a phenomenon in which the shaping material drips from the nozzle 10 and is formed into a string-like shape by temporarily sucking the shaping material in the flow channel 10b when stopping the ejection of the shaping material from the nozzle 10. In this embodiment, the suction section 13 is constituted by a plunger. The suction section 13 is driven by a suction section drive section 132 under the control of the control unit 23. The suction section drive section 132 is constituted by, for example, a stepping motor, a rack and pinion mechanism that converts the rotational force of a stepping motor into a translational motion of a plunger, or the like.

A send-out port 133 is an opening provided in the flow channel 10b. A sending channel 131 is constituted by a through-hole that linearly extends and crosses the flow channel 10b. The sending channel 131 is a flow channel for a gas coupled to the suction section drive section 132 and the send-out port 133. A gas sent out from the suction section drive section 132 passes through the sending channel 131 and is sent into the flow channel 10b from the send-out port 133. The gas supplied into the flow channel 10b pressure-feeds the plasticized material remaining in the flow channel 10b to the ejection port 10a side by further continuously supplying the gas from the suction section drive section 132. The pressure-fed plasticized material is ejected from the ejection port 10a.

According to such a configuration, the three-dimensional shaping apparatus 1 of this embodiment can promptly eject the plasticized material in the flow channel 10b from the ejection port 10a. Further, ejection of the molten shaping material from the ejection port 10a can be promptly stopped. Note that the shape of the opening of the send-out port 133 coupled to the flow channel 10b is smaller than the shape of the cross section perpendicular to the moving direction of the plasticized material in the flow channel 10b. According to this, the plasticized material moving in the flow channel 10b can be prevented from flowing in from the send-out port 133 and flowing backward inside the sending channel 131.

The three-dimensional shaping apparatus 1 of this embodiment includes the plasticizing section 27, the nozzle 10, and the like as described above, and these can move along the X-axis direction and the Y-axis direction as a plasticized material ejection unit 100. The plasticized material ejection unit 100 moves along the X-axis direction and the Y-axis direction by controlling a position changing mechanism 26 by the control unit 23. As shown in FIG. 1, the three-dimensional shaping apparatus 1 of this embodiment includes a chamber 16 whose internal temperature is adjustable, and the ejection port 10a is disposed inside the chamber 16. Then, at the position opposed to the ejection port 10a, the table 14 for shaping a three-dimensional shaped article is provided. The table 14 can move along the Z-axis direction through a moving mechanism 15 and is also disposed so that a shaping face 14a for a three-dimensional shaped article is located inside the chamber 16. The chamber 16 of this embodiment is configured to include a warm air inlet 22 for introducing warm air into the chamber 16 in an air blowing direction F, but it is not limited to the chamber 16 having such a configuration, and for example, a configuration in which a heater is included inside the chamber 16 may be adopted.

As shown in FIG. 1, in the three-dimensional shaping apparatus 1, the plasticized material ejection unit 100 in which the ejection port 10a is disposed inside the chamber 16 can move along the X-axis direction and the Y-axis direction, and also a first heat-resistant member 17 is included so that heat inside the chamber 16 does not escape to the outside of the chamber 16. Further, the table 14 with the shaping face 14a disposed inside the chamber 16 can move along the Z-axis direction, and also a second heat-resistant member 21 is included so that heat inside the chamber 16 does not escape to the outside of the chamber 16.

Figure 5:
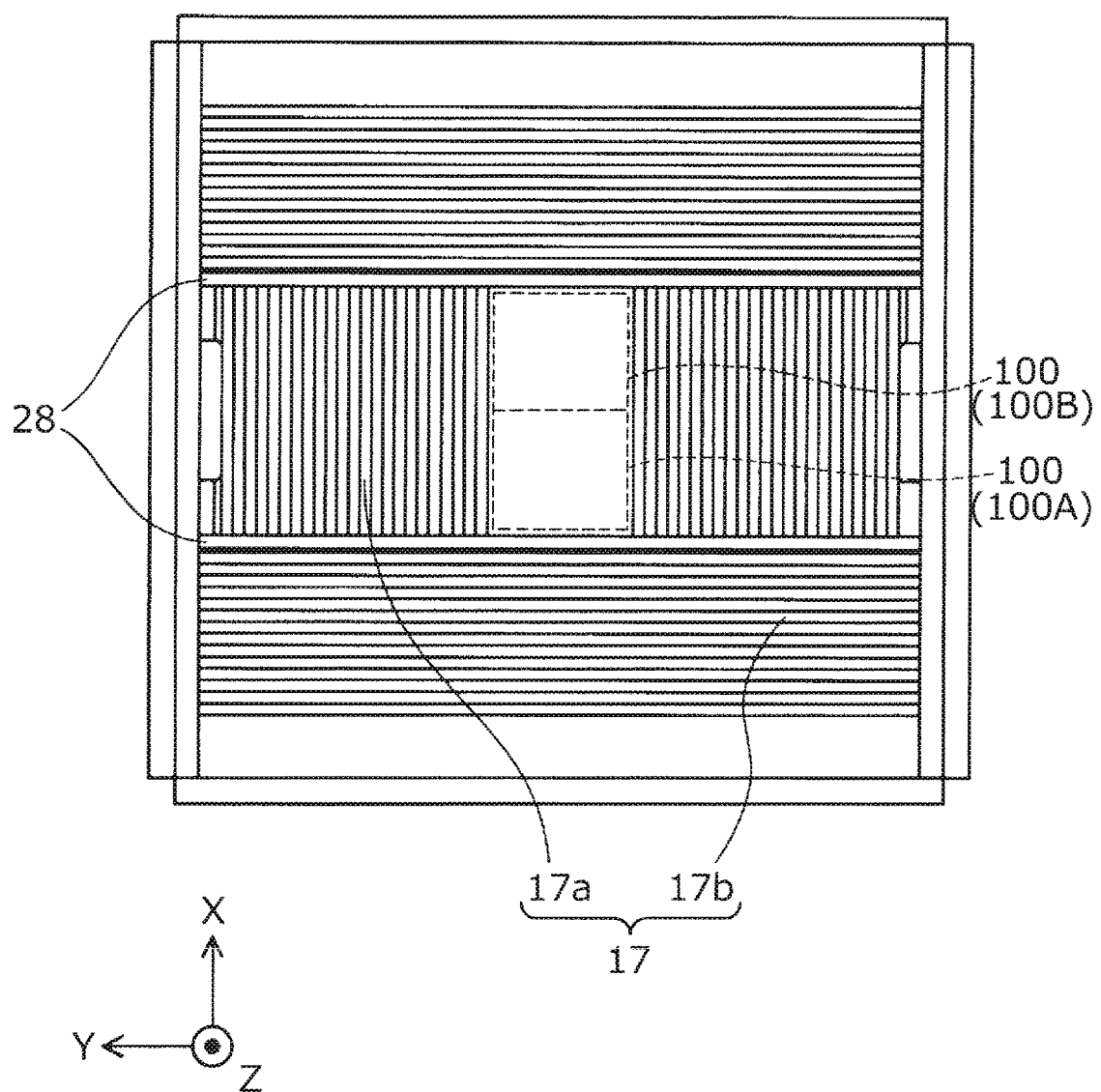
FIG. 5 is a plan view showing an appearance structure of a first heat-resistant member.

Here, the three-dimensional shaping apparatus 1 of this embodiment not only includes a shaping material ejection unit 100A that injects the shaping material as the plasticized material as shown in FIG. 1, but also includes a support material ejection unit 100B for forming a support material layer for supporting a shaping material layer formed at the table 14 as shown in FIG. 5 as the plasticized material ejection unit 100. However, the support material ejection unit 100B has the same configuration as the shaping material ejection unit 100A and can be described in the same manner as the shaping material ejection unit 100A by replacing the plasticized material in the above description with the support material instead of the shaping material, and therefore, the detailed description thereof will be omitted. The shaping material ejection unit 100A and the support material ejection unit 100B are integrally moved by the position changing mechanism 26. Note that the three-dimensional shaping apparatus 1 of this embodiment is configured to include one shaping material ejection unit 100A and one support material ejection unit 100B which mutually and integrally move, however, it may be configured to include a plurality of shaping material ejection units 100A and a plurality of support material ejection units 100B, or may be configured such that the shaping material ejection unit 100A and the support material ejection unit 100B separately move. Moreover, in place of the plasticized material ejection unit 100 in which the flat screw 4 is included in the plasticizing section 27, a plasticized material ejection unit having another configuration may be used. For example, a plasticized material ejection unit including an inline screw may be used.

The first heat-resistant member 17 includes a structure that expands and contracts in the horizontal direction in response to the movement of the plasticized material ejection unit 100 in the horizontal direction. As shown in FIG. 5, in the three-dimensional shaping apparatus 1, two rails 28 that are slidably movable along the Y-axis direction are extended along the X-axis direction, and the plasticized material ejection unit 100 is attached between the two rails 28 so as to be slidably movable along the X-axis direction. The first heat-resistant member 17 is constituted by a first cover 17a that expands and contracts in the X-axis direction and a second cover 17b that expands and contracts in the Y-axis direction. In this embodiment, the first cover 17a and the second cover 17b each have heat resistance capable of withstanding the internal temperature of the chamber 16, and have a bellows-shaped expandable and contractible structure. As the first cover 17a, one set is disposed so as to sandwich the plasticized material ejection unit 100 in the X-axis direction between the two rails 28. As the second cover 17b, one set is disposed so as to sandwich the plasticized material ejection unit 100 in the Y-axis direction outside the two rails 28. In this embodiment, the first heat-resistant member 17 is configured by coating a glass fiber woven fabric with silicone. The configuration of the first heat-resistant member 17 is not limited thereto, and for example, it may be configured by coating a glass fiber woven fabric with a fluororesin in place of silicone.

Figure 6:
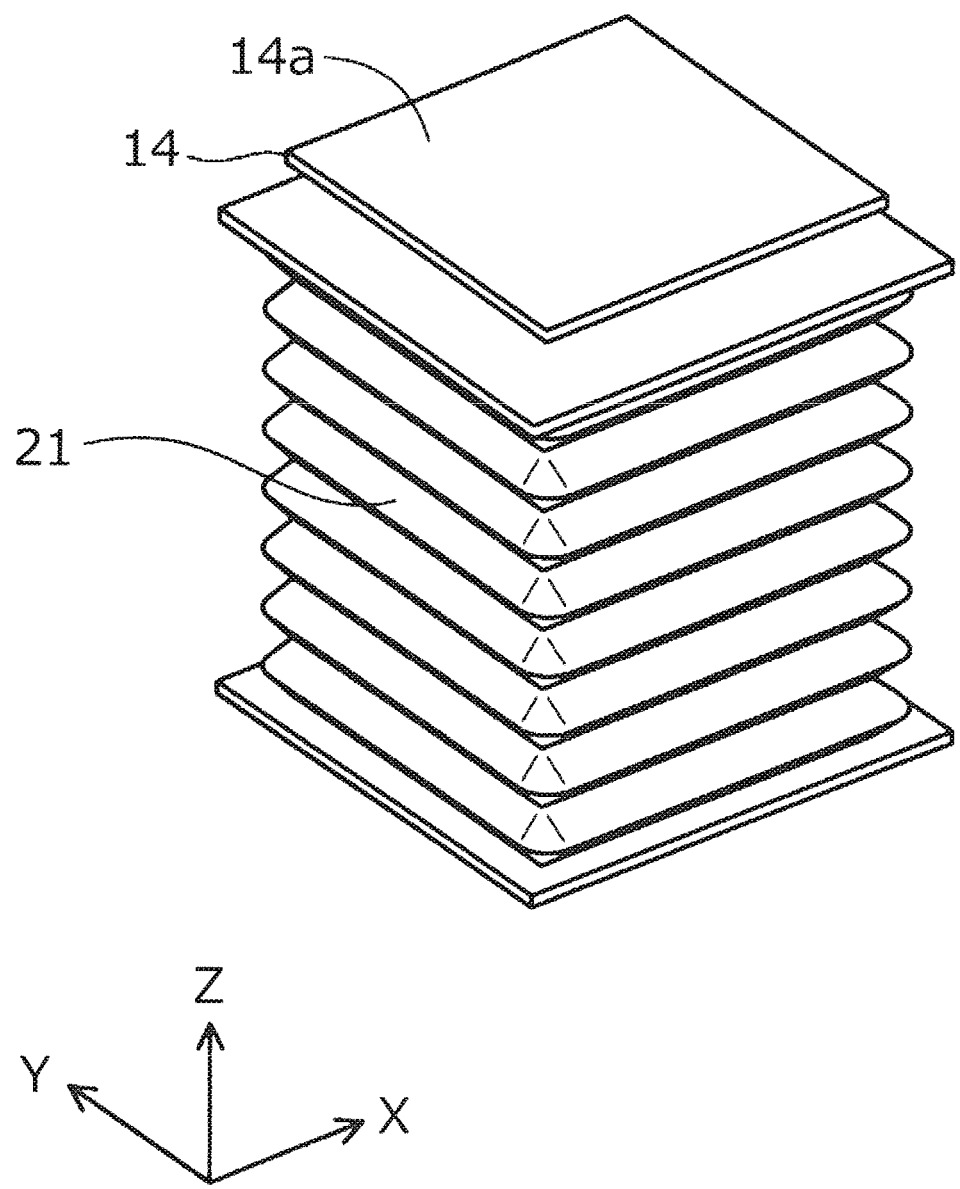
FIG. 6 is a perspective view showing an appearance structure of a second heat-resistant member.

The second heat-resistant member 21 is configured in the same form by the same material as the first heat-resistant member 17 except the arrangement direction. Specifically, the second heat-resistant member 21 has heat resistance capable of withstanding the internal temperature of the chamber 16, and has a bellows-shaped expandable and contractible structure. As shown in FIG. 6, the table 14 has a rectangular shape, and the second heat-resistant member 21 is provided corresponding to each of the four sides of the table 14.

As shown in FIG. 1, the three-dimensional shaping apparatus 1 of this embodiment includes a brush 24 as the cleaning mechanism that cleans the ejection port 10a of the shaping material ejection unit 100A and the support material ejection unit 100B. The control unit 23 moves the plasticized material ejection unit 100 to a cleaning position opposed to the brush 24 when cleaning the ejection port 10a of the shaping material ejection unit 100A and the support material ejection unit 100B. Then, by moving the plasticized material ejection unit 100 so as to come in contact with the brush 24, the ejection port 10a is cleaned. The brush 24 of this embodiment is configured to be movable to a position capable of coming in contact with the ejection port 10a of the shaping material ejection unit 100A and a position capable of coming in contact with the ejection port 10a of the support material ejection unit 100B by controlling a brush moving mechanism (not shown) by the control unit 23. However, it may be configured to be a brush extending in the X-axis direction and be able to simultaneously come in contact with the ejection port 10a of the shaping material ejection unit 100A and the ejection port 10a of the support material ejection unit 100B. Moreover, there is no limitation on the configuration of the cleaning mechanism, and a cleaning mechanism having a configuration other than the brush such as a wiper blade may be included.

Further, as shown in FIG. 1, the three-dimensional shaping apparatus 1 of this embodiment includes the control unit 23, and the control unit 23 controls various drives of the three-dimensional shaping apparatus 1. The control unit 23 is electrically coupled to the plasticized material ejection unit 100, the support material ejection unit, the position changing mechanism 26, the moving mechanism 15, and a temperature adjustment mechanism for the chamber 16. The respective constituent members of the three-dimensional shaping apparatus 1 are driven under the control of the control unit 23, and the shaping process, the cleaning process, or the like is executed.

Next, a three-dimensional shaped article production method to be executed using the three-dimensional shaping apparatus 1 of this embodiment will be described with reference to FIGS. 7 and 8. As described above, the three-dimensional shaping apparatus 1 of this embodiment includes the nozzle 10 having the flow channel 10b, through which the plasticized material flows, and the ejection port 10a, which communicates with the flow channel 10b, and from which the plasticized material is ejected to the table 14. Further, the apparatus includes the flow rate adjustment mechanism 12 and the suction section 13 as the ejection adjustment mechanism that adjusts the ejection amount of the plasticized material from the ejection port 10a, the position changing mechanism 26 that changes a relative position of the nozzle 10 to the table 14, the pressure measurement section 11 that measures the pressure in the flow channel 10b, and the brush 24 as the cleaning mechanism that cleans the ejection port 10a. Here, the pressure measurement section 11 is constituted by a pressure sensor and is provided in the flow channel 10b. A value of the pressure measured by the pressure measurement section 11 is transmitted to the control unit 23.

First, a three-dimensional shaped article production method shown in the flowchart in FIG. 7 will be described. The three-dimensional shaped article production method in FIG. 7 is an Example of a three-dimensional shaped article production method for producing a three-dimensional shaped article without using a support material. Therefore, the plasticized material ejection unit 100 to be used in the three-dimensional shaped article production method is only the shaping material ejection unit 100A.

Figure 7:
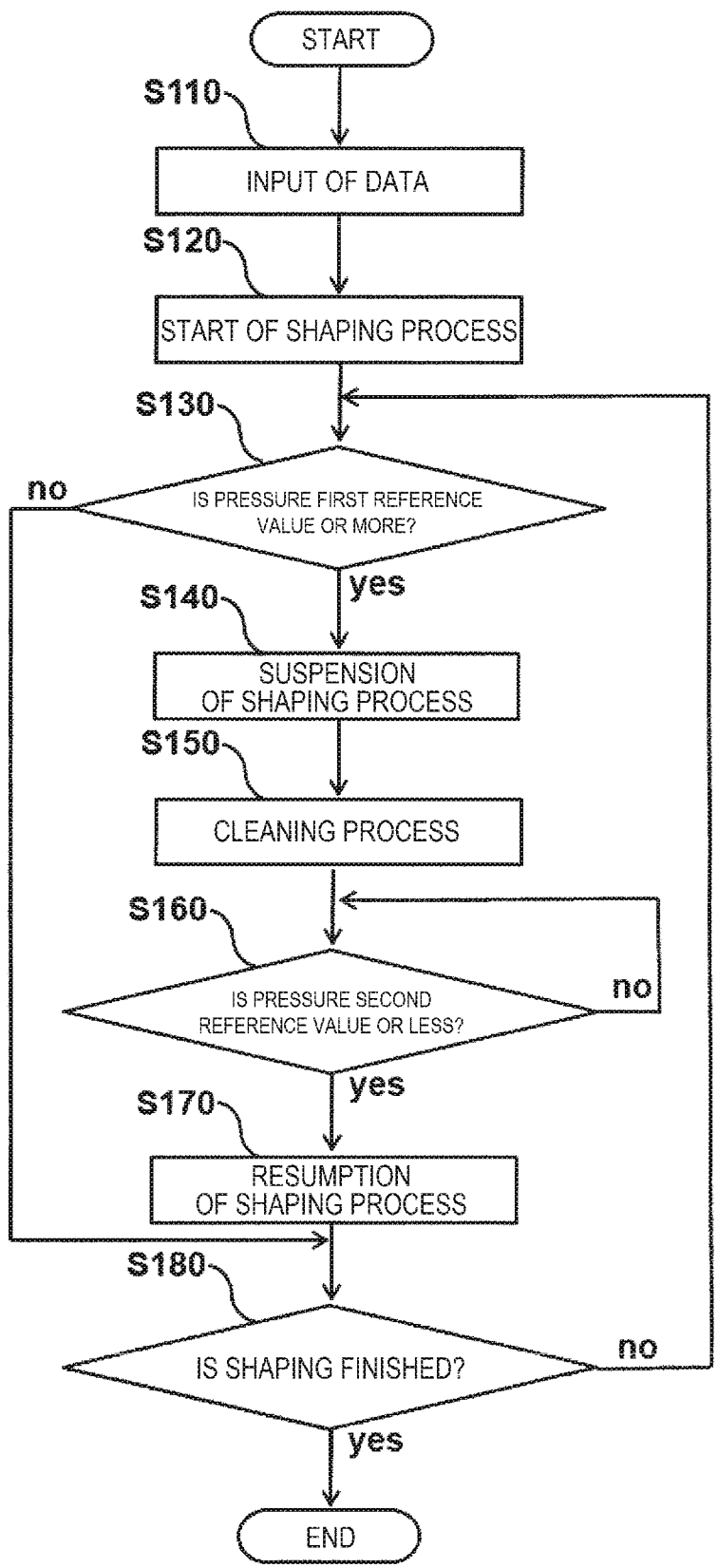
FIG. 7 is a flowchart showing a procedure of a three-dimensional shaped article production method performed using a three-dimensional shaping apparatus of one embodiment of the present disclosure.

When the three-dimensional shaped article production method in FIG. 7 is started, first, in Step S110, data of a three-dimensional shaped article to be shaped is input. Then, in Step S120, a shaping processing step is started. As described above, the three-dimensional shaping apparatus 1 of this embodiment includes the control unit 23, and by the control unit 23, the flat screw 4 is rotated, and also the position changing mechanism 26 or the like is controlled, and the shaping processing step of shaping a three-dimensional shaped article is executed by stacking layers of the shaping material at the table 14.

Subsequently, in Step S130, the control unit 23 determines whether or not the measurement result of the pressure in the flow channel 10b by the pressure measurement section 11 is a first reference value or more. That is, it is determined whether or not the ejection port 10a is in a state where it can appropriately eject the shaping material. Here, as for a timing when it is determined whether or not the measurement result is the first reference value or more, the determination may be made for each layer or may be made each time a fixed period of time elapses. This Step S130 may be omitted. In a case where this Step S130 is omitted, for example, if a predetermined time has not elapsed from the final execution of the cleaning processing step of Step S150, the process proceeds to Step S180, and if a predetermined time has elapsed from the final execution of the cleaning processing step, the process can proceed to Step S140, or the like. This is because when the flow channel 10b in the vicinity of the ejection port 10a is clogged with the shaping material and the ejection port 10a is in a state where the shaping material cannot be appropriately ejected, the pressure in the flow channel 10b increases. Then, when it is determined that the measurement result of the pressure in the flow channel 10b is the first reference value or more, the process proceeds to Step S140, and when it is determined that the measurement result of the pressure in the flow channel 10b is less than the first reference value, the process proceeds to Step S180.

In Step S140, under the control of the control unit 23, the shaping processing step is suspended by stopping the rotation of the flat screw 4 or controlling the suction section drive section 132, or the like. Then, the process proceeds to Step S150, and the cleaning processing step is executed. In the cleaning processing step of Step S150, the shaping material ejection unit 100A is moved to a contact position with the brush 24 that is the cleaning position, and the ejection port 10a is brushed with the brush 24. When the cleaning processing step of Step S150 is finished, the process proceeds to Step S160. The cleaning process is not particularly limited, and instead of brushing of the ejection port 10a with the brush 24, for example, the shaping material may be purged from the nozzle 10 or the like as the cleaning process.

In Step S160, the control unit 23 determines whether or not the measurement result of the pressure in the flow channel 10b by the pressure measurement section 11 is a second reference value or less. In this Example, the second reference value is set to the same pressure as the first reference value, but may be set to a different pressure from the first reference value. Then, the process waits by repeating Step S160 until it is determined that the measurement result of the pressure in the flow channel 10b is the second reference value or less, and after it is determined that the measurement result of the pressure in the flow channel 10b is the second reference value or less, the process proceeds to Step S170 and the shaping processing step is resumed.

Then, in Step S180, the control unit 23 determines whether or not shaping based on the data input in Step S110 is finished. When it is determined that shaping is finished by the control unit 23, the three-dimensional shaped article production method of this Example is finished. On the other hand, when it is determined that shaping is not yet finished by the control unit 23, the process returns to Step S130, and Step S130 to Step S180 are repeated until it is determined that shaping is finished in Step S180. In the three-dimensional shaped article production method of this Example, for example, the flow from Step S130 to Step S180 can be regarded as the shaping processing step for one layer.

As described above, the three-dimensional shaped article production method in FIG. 7 is an Example of the three-dimensional shaped article production method for producing a three-dimensional shaped article without using a support material. However, a three-dimensional shaped article may be produced using a support material in addition to a shaping material, for example, by repeating execution of the steps from Step S120 to Step S180 using the shaping material ejection unit 100A and execution of the steps from Step S120 to Step S180 using the support material ejection unit 100B for each layer.

Next, a three-dimensional shaped article production method shown in the flowchart in FIG. 8 will be described. The three-dimensional shaped article production method in FIG. 8 is an Example of a three-dimensional shaped article production method for producing a three-dimensional shaped article using a support material in addition to a shaping material. Therefore, the plasticized material ejection unit 100 to be used in the three-dimensional shaped article production method is both the shaping material ejection unit 100A and the support material ejection unit 100B.

Figure 8:
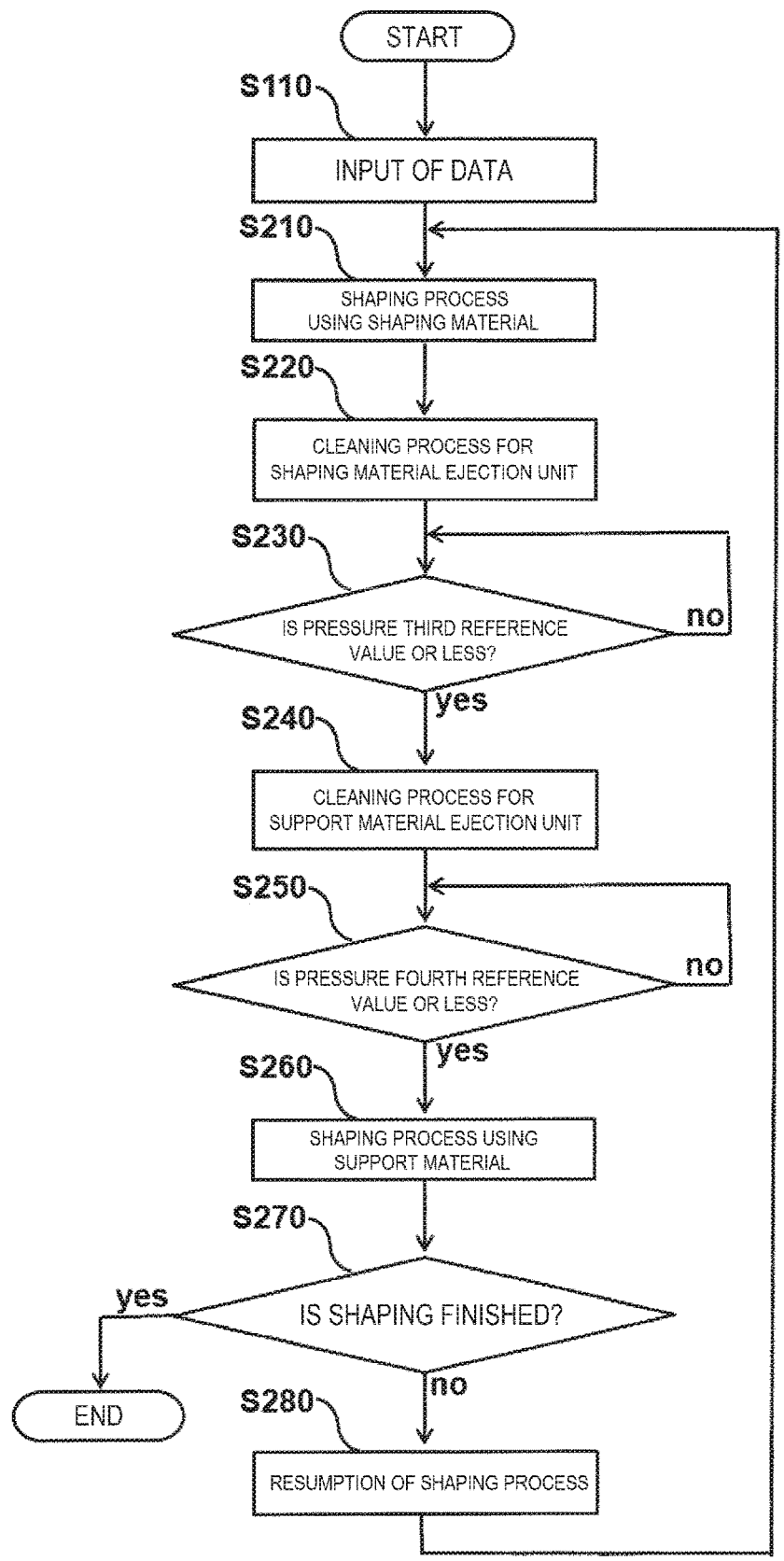
FIG. 8 is a flowchart showing a procedure of a three-dimensional shaped article production method performed using a three-dimensional shaping apparatus of one embodiment of the present disclosure, and is a flowchart showing a procedure of a three-dimensional shaped article production method that is different from the flowchart in FIG. 7.

When the three-dimensional shaped article production method in FIG. 8 is started, first, in Step S110, data of a three-dimensional shaped article to be shaped is input in the same manner as the three-dimensional shaped article production method in FIG. 7. Then, in Step S210, a shaping processing step is executed using a shaping material. Here, for example, the shaping processing step for one layer in the three-dimensional shaped article to be shaped by stacking can be executed.

When the shaping processing step using the shaping material is finished, the shaping processing step is once finished by stopping the rotation of the flat screw 4 or the like, and the process proceeds to Step S220, and a cleaning processing step for the shaping material ejection unit 100A is executed. This Step is the same as the cleaning processing step of Step S150 described above, and when this Step is finished, the process proceeds to Step S230. Note that instead of execution of the cleaning processing step of this Step after the shaping processing step using the shaping material in Step S210 is finished, a method in which the cleaning processing step of this Step is executed according to whether or not the measurement result of the pressure in the flow channel 10b by the pressure measurement section 11 is a reference value or more in the same manner as the three-dimensional shaped article production method shown in the flowchart in FIG. 7 may be adopted.

In Step S230, the control unit 23 determines whether or not the measurement result of the pressure in the flow channel 10b by the pressure measurement section 11 in the shaping material ejection unit 100A is a third reference value or less. In this Example, the third reference value is set to the same pressure as the second reference value, but may be set to a different pressure from the second reference value. Then, the process waits by repeating Step S230 until it is determined that the measurement result of the pressure in the flow channel 10b is the third reference value or less, and after it is determined that the measurement result of the pressure in the flow channel 10b is the third reference value or less, the process proceeds to Step S240, and a cleaning processing step for the support material ejection unit 100B is executed.

The cleaning processing step for the support material ejection unit 100B of Step S240 is such that the shaping material ejection unit 100A in the cleaning processing step for the shaping material ejection unit 100A of Step S220 is merely replaced with the support material ejection unit 100B. When this Step is finished, the process proceeds to Step S250.

In Step S250, the control unit 23 determines whether or not the measurement result of the pressure in the flow channel 10b by the pressure measurement section 11 in the shaping material ejection unit 100A is a fourth reference value or less. Then, the process waits by repeating Step S250 until it is determined that the measurement result of the pressure in the flow channel 10b is the fourth reference value or less, and after it is determined that the measurement result of the pressure in the flow channel 10b is the fourth reference value or less, the process proceeds to Step S260.

In Step S250, it may be determined whether or not a pressure difference between the pressure in the flow channel 10b in the shaping material ejection unit 100A and the pressure in the flow channel 10b in the support material ejection unit 100B is a predetermined value or less. That is, it may be determined whether or not the ejection port 10a is appropriately cleaned by execution of the cleaning processing step for the support material ejection unit 100B in Step S240 using the pressure normalized by undergoing Step S220 and Step S230 as a comparison target.

In Step S260, the support material is ejected into a region that supports the shaping material using the support material ejection unit 100B. Here, for example, the shaping processing step for one layer can be executed in the same manner as in Step S210.

Then, in Step S270, the control unit 23 determines whether or not shaping based on the data input in Step S110 is finished. When it is determined that shaping is finished by the control unit 23, the three-dimensional shaped article production method of this Example is finished. On the other hand, when it is determined that shaping is not yet finished by the control unit 23, the process proceeds to Step S280 to resume the shaping process, and Step S210 to Step S280 are repeated until it is determined that shaping is finished in Step S270. As described above, in the three-dimensional shaped article production method in FIG. 8, for example, the flow from Step S210 to Step S280 can be regarded as the shaping processing step for one layer.

As described above, in the three-dimensional shaped article production method of this Example, under the control of the control unit 23, the shaping processing step (Step S120 to Step S180, and Step S210 and Step S260) of shaping a three-dimensional shaped article by stacking layers of the plasticized material at the table 14 is executed. Further, the cleaning processing step (Step S150, and Step S220 and Step S240) of causing the brush 24 as the cleaning mechanism to perform cleaning by suspending the shaping processing step in the middle of the shaping processing step and moving the nozzle to the cleaning region is executed. Further, when the pressure measured by the pressure measurement section 11 is a reference value (the second reference value or the third reference value) or less after executing the cleaning processing step, the resuming step (Step S170 and Step S280) of resuming the shaping processing step is executed.

Here, the phrase "when the pressure measured by the pressure measurement section 11 is a reference value or less after executing the cleaning process" means that the pressure may be measured to be a reference value or less at least after executing the cleaning process, and is meant to include not only a case where the pressure before executing the cleaning process is a reference value or more and also a case where the pressure before executing the cleaning process is less than a reference value. In the three-dimensional shaped article production method of this Example, when the pressure measured by the pressure measurement section 11 is a reference value or less after executing the cleaning process, the shaping process is resumed. Therefore, when the shaping process is resumed, the shaping material can be prevented from leaking out from the nozzle 10 so that the adhesion of the shaping material to a three-dimensional shaped article can be suppressed. Accordingly, a decrease in shaping accuracy of the three-dimensional shaped article can be suppressed.

As described above, the three-dimensional shaping apparatus 1 of this embodiment includes the plasticizing section 27 that forms a plasticized material by plasticizing a solid material. By including the plasticizing section 27, a plasticized material can be easily formed by plasticizing a solid material using the plasticizing section 27.

Further, as described above, the three-dimensional shaping apparatus 1 of this embodiment includes the flow rate adjustment mechanism 12 and the suction section 13. The flow rate adjustment mechanism 12 and the suction section 13 are provided between the plasticizing section 27 and the ejection port 10a, and play a role as the ejection adjustment mechanism that switches between suspension and resumption of ejection of the shaping material from the ejection port 10a. Here, the pressure measurement section 11 measures the pressure in the flow channel 10b after adjustment by the ejection adjustment mechanism so that the plasticized material is in an ejectable state from the ejection port 10a. Accordingly, even when the pressure measurement section measures the pressure in the flow channel 10b at a position between the plasticizing section 27 and the ejection adjustment mechanism, the pressure near the ejection port 10a can be accurately measured.

On the other hand, the pressure measurement section 11 may be provided between the ejection adjustment mechanism (the flow rate adjustment mechanism 12 and the suction section 13) and the ejection port 10a. According to such a configuration, the pressure measurement section 11 measures the pressure in the flow channel 10b at a position between the ejection adjustment mechanism and the ejection port 10*a*, and therefore, the pressure near the ejection port 10*a* can be accurately measured regardless of the magnitude of the amount of movement of the plasticized material in the flow channel 10*b* by driving the ejection adjustment mechanism.

Further, as described above, the three-dimensional shaping apparatus 1 of this embodiment includes the shaping material ejection unit 100A and the support material ejection unit 100B as the plasticized material ejection unit 100. Expressed in another way, as the nozzle 10 for a plasticized material that ejects a plasticized material, a nozzle for a shaping material that ejects a shaping material for shaping a three-dimensional shaped article and a nozzle for a support material that ejects a support material for supporting the shaping material are included. Further, the shaping material ejection unit 100A and the support material ejection unit 100B each include the pressure measurement section 11. Expressed in another way, as the pressure measurement section 11, a pressure measurement section for a shaping material that measures the pressure in the flow channel 10*b* in the nozzle for a shaping material, and a pressure measurement section for a support material that measures the pressure in the flow channel 10*b* in the nozzle for a support material are included. Here, the control unit 23 can drive the nozzle for a shaping material and the nozzle for a support material in a switching manner and also can execute the cleaning process for both the nozzle for a shaping material and the nozzle for a support material when switching as shown in Step S220 to Step S250 in the flowchart in FIG. 8. Then, in Step S250, after the pressures in the flow channel 10*b* in the nozzle for a shaping material and in the flow channel 10*b* in the nozzle for a support material or the difference between the pressure in the flow channel 10*b* in the nozzle for a shaping material and the pressure in the flow channel 10*b* in the nozzle for a support material become or becomes a predetermined value or less, the shaping process can be resumed in Step S270.

In this manner, the three-dimensional shaping apparatus 1 of this embodiment includes the nozzle fora support material that ejects a support material, and therefore, by shaping a three-dimensional shaped article using the support material, the shaping accuracy of the three-dimensional shaped article can be enhanced. Further, when the nozzle for a shaping material and the nozzle for a support material are switched, the cleaning process is executed for both nozzles, and after the difference between the pressure in the flow channel in the nozzle for a shaping material and the pressure in the flow channel in the nozzle for a support material becomes a predetermined value or less, the shaping process can be resumed. Accordingly, since the shaping process can be resumed after the pressure in the flow channel in the nozzle for a shaping material and the pressure in the flow channel in the nozzle for a support material becomes normal, adhesion of the shaping material leaking out from the nozzle 10 to a three-dimensional shaped article during shaping can be suppressed, and thus, the shaping accuracy of the three-dimensional shaped article can be enhanced.

Further, as shown in Step S130 in the flowchart in FIG. 7, the control unit 23 can execute the cleaning process (Step S150) when the pressure in the flow channel 10*b* is measured to be a predetermined value (first reference value) or more by the pressure measurement section 11. Therefore, in the three-dimensional shaping apparatus 1 of this embodiment, the cleaning process can be executed by accurately determining when the cleaning process is needed.

Further, the control unit 23 can prevent the plasticizing section 27 from being driven during execution of the cleaning process (Step S150, and Step S220 and Step S240). The pressure in the flow channel 10*b* sometimes varies during driving of the plasticizing section 27, and when the cleaning process is executed in such a state, the cleaning process is not appropriately executed in some cases. However, by preventing the plasticizing section 27 from being driven during execution of the cleaning process, the cleaning process can be prevented from being not appropriately executed.

Further, the cleaning processing step of Step S150, and Step S220 and Step S240 may include an ejection amount adjustment process for performing adjustment of the ejection amount of the plasticized material from the nozzle 10 using at least one of the line width of the plasticized material ejected from the ejection port 10*a* and the ejection amount of the plasticized material ejected from the ejection port 10*a*. By performing the ejection amount adjustment process using at least one of the line width of the plasticized material ejected from the ejection port 10*a* and the ejection amount of the plasticized material ejected from the ejection port 10*a* in the cleaning processing step, the cleaning processing step is executed, and also the adjustment of the ejection amount can be performed. Here, the "line width" means an ejection width of the plasticized material when the plasticized material is continuously ejected from the nozzle 10.

Further, as described above, in the three-dimensional shaping apparatus 1 of this embodiment, the plasticizing section 27 includes the drive motor 6, the flat screw 4 that is rotated by the drive motor 6 and has the groove formed face 41 with the spiral groove 44 formed therein, the barrel 5 that has the opposed face 52 opposed to the groove formed face 41 and is provided with the communication hole 51, and the heater 7 that heats the barrel 5. By using a plasticizing section having such a configuration as the plasticizing section 27, a solid material can be effectively plasticized. In the three-dimensional shaping apparatus 1 of this embodiment, the heater 7 that heats the barrel 5 is included as the heating section, but a heating section that heats the flat screw 4 may be included.

Further, as described above, in the three-dimensional shaping apparatus 1 of this embodiment, the chamber 16 whose internal temperature is adjustable is included, and the brush 24 as the cleaning mechanism is provided in the chamber 16. Therefore, the brush 24 can be heated. That is, the cleaning performance can be improved by adjusting the temperature of the cleaning mechanism.

Further, as shown in FIG. 1, in the three-dimensional shaping apparatus 1 of this embodiment, the chamber 16 has the warm air inlet 22 inside, and the brush 24 is provided on an extension line in the air blowing direction F of the warm air inlet 22. That is, the brush that comes in contact with the ejection port 10*a* is provided at a position where warm air is introduced from the warm air inlet 22. Therefore, in the three-dimensional shaping apparatus 1 of this embodiment, cleaning of the nozzle 10 can be effectively executed using the brush 24 while adjusting the temperature at the cleaning position.

The present disclosure is not limited to the above-mentioned Examples, but can be realized in various configurations without departing from the gist of the present disclosure. The technical features in the Examples corresponding to the technical features in the respective aspects described in "SUMMARY" of the present disclosure may be appropriately replaced or combined in order to solve part or all of the problems described above or achieve part or all of the advantageous effects described above. Further, the technical features may be appropriately deleted unless they are described as essential features in the specification.

What is claimed is:

1. A three-dimensional shaping apparatus, comprising:
   a plasticizing section that forms a plasticized material by plasticizing a material;
   a flow channel, through which the plasticized material flows;
   a nozzle that communicates with the flow channel and has an ejection port, from which the plasticized material is ejected to a shaping region of a table;
   an ejection adjustment mechanism that adjusts an ejection amount of the plasticized material from the ejection port;
   a position changing mechanism that changes a relative position of the nozzle to the table;
   a pressure measurement section that measures a pressure in the flow channel;
   a cleaning mechanism that is provided in a cleaning region different from the shaping region and cleans the nozzle; and
   a control unit that controls the ejection adjustment mechanism, and the position changing mechanism and executes a shaping process for shaping a three-dimensional shaped article by stacking layers of the plasticized material at the table, wherein
   the control unit
   executes a cleaning process for causing the cleaning mechanism to perform cleaning by suspending the shaping process in the middle of the shaping process, and moving the nozzle to the cleaning region, and
   resumes the shaping process when the pressure measured by the pressure measurement section is a reference value or less after executing the cleaning process.

2. The three-dimensional shaping apparatus according to claim 1, wherein
   the ejection adjustment mechanism is provided in the flow channel, and
   the pressure measurement section measures the pressure in the flow channel between the ejection adjustment mechanism and the ejection port.

3. The three-dimensional shaping apparatus according to claim 1, wherein
   the ejection adjustment mechanism is provided in the flow channel, and
   the pressure measurement section measures the pressure in the flow channel between the plasticizing section and the ejection adjustment mechanism after adjustment by the ejection adjustment mechanism so that the plasticized material is in an ejectable state from the ejection port.

4. The three-dimensional shaping apparatus according to claim 1, wherein
   as a nozzle for a plasticized material that ejects the plasticized material, a nozzle for a shaping material that ejects a shaping material for shaping a three-dimensional shaped article and a nozzle for a support material that ejects a support material for supporting the shaping material are included,
   as the pressure measurement section, a pressure measurement section for a shaping material that measures a pressure in the flow channel in the nozzle for a shaping material, and a pressure measurement section for a support material that measures a pressure in the flow channel in the nozzle for a support material are included, and
   the control unit
   drives the nozzle for a shaping material and the nozzle for a support material in a switching manner, and also executes the cleaning process for both the nozzle for a shaping material and the nozzle for a support material when switching, and
   resumes the shaping process after the pressure in the flow channel in the nozzle for a shaping material and in the flow channel in the nozzle for a support material becomes a predetermined value or less.

5. The three-dimensional shaping apparatus according to claim 1, wherein
   the control unit executes the cleaning process when the pressure is measured to be a predetermined value or more by the pressure measurement section.

6. The three-dimensional shaping apparatus according to claim 1, wherein
   the control unit prevents the plasticizing section from being driven during execution of the cleaning process.

7. The three-dimensional shaping apparatus according to claim 1, wherein
   the plasticizing section includes
   a drive motor,
   a screw that is rotated by the drive motor and has a groove formed face with a spiral groove formed therein,
   a barrel that has an opposed face opposed to the groove formed face and is provided with a communication hole, and
   a heating section that heats at least one of the screw and the barrel.

8. The three-dimensional shaping apparatus according to claim 1, wherein
   the cleaning process includes an ejection amount adjustment process for performing adjustment of the ejection amount of the plasticized material from the nozzle using at least one of a line width of the plasticized material ejected from the ejection port and the ejection amount of the plasticized material ejected from the ejection port.

9. The three-dimensional shaping apparatus according to claim 1, wherein
   a chamber whose internal temperature is adjustable is included, and
   the cleaning mechanism is provided in the chamber.

10. The three-dimensional shaping apparatus according to claim 9, wherein
    the chamber has a warm air inlet inside, and
    the cleaning mechanism has a brush that comes in contact with a face where the ejection port is formed at a position where warm air is introduced from the warm air inlet.

* * * * *